No. 741,831. Patented October 20, 1903.

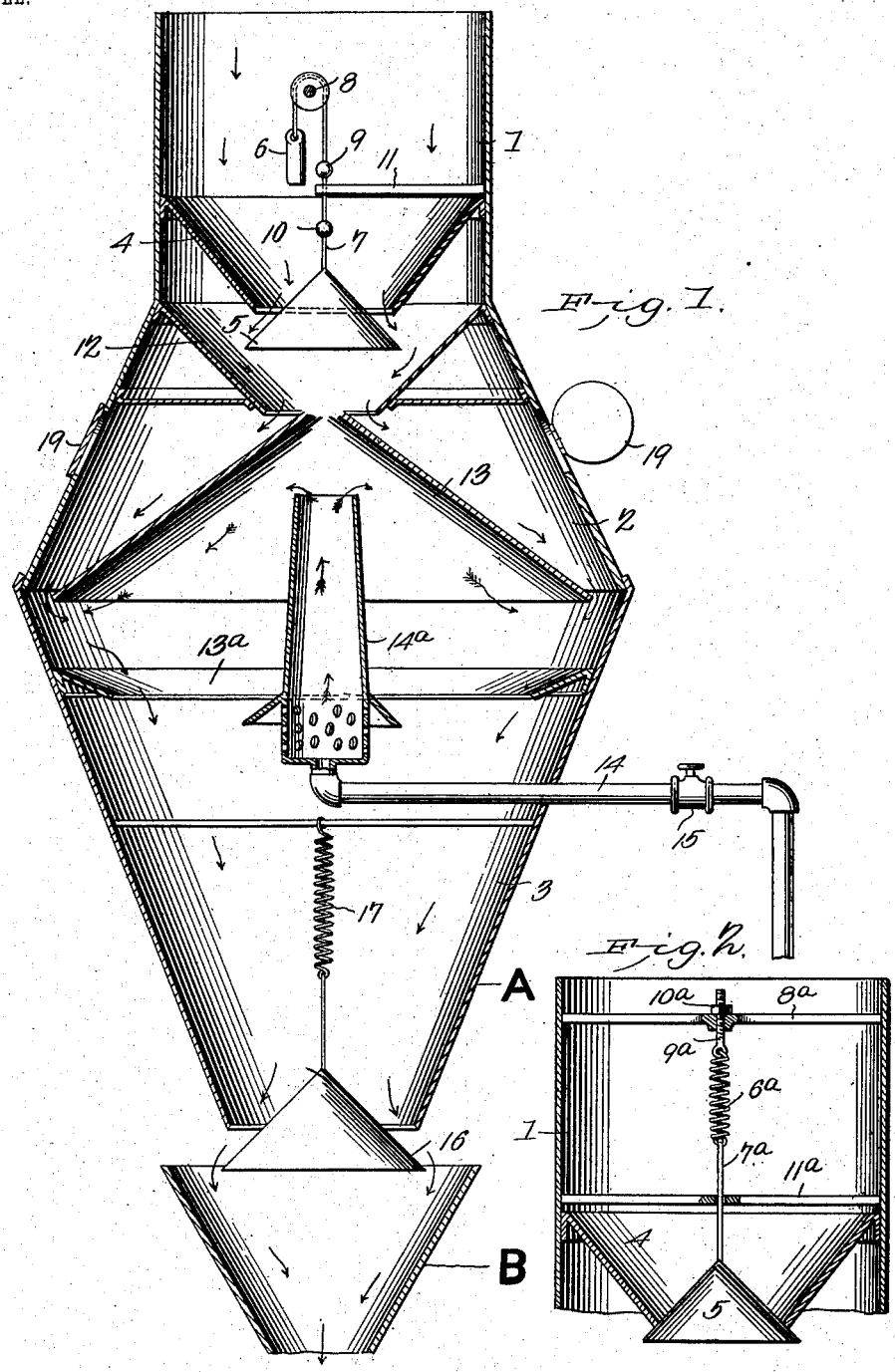

UNITED STATES PATENT OFFICE.

PETER PROVOST, OF MENOMINEE, MICHIGAN.

APPARATUS FOR STEAMING GRAIN.

SPECIFICATION forming part of Letters Patent No. 741,831, dated October 20, 1903.

Application filed March 19, 1903. Serial No. 148,614. (No model.)

*To all whom it may concern:*

Be it known that I, PETER PROVOST, a citizen of the United States, residing at Menominee, in the county of Menominee and State of Michigan, have invented a new and useful Apparatus for Steaming Grain, of which the following is a specification.

This invention relates to apparatus for steaming grain prior to grinding, and is intended for use with wheat, oats, barley, or any other kind of grain which it is desirable to steam before grinding.

The object of the invention is to provide means whereby the steam may be used more effectively than in devices of similar character hitherto used for this purpose, so that a small quantity of steam may be used to steam a larger quantity of wheat or other grain than has heretofore been possible.

A further object of the invention is to provide an apparatus of the class above specified which shall contain no unnecessary and expensive constructive features and which shall be readily cleanable.

With this and other objects in view, which will appear as the invention is more fully disclosed, it consists in the construction and combination of parts of a wheat-steamer hereinafter described, shown in the accompanying drawings, and having the novel features thereof pointed out in the appended claims.

In the accompanying drawings there is shown in vertical section the preferred form of embodiment of my invention, it being of course understood that I do not desire to be limited to the exact form and proportions shown in the drawings and described in this specification, but reserve the right to make such changes therein as do not depart from the spirit of the invention and lie within the scope of the appended claims.

In the drawings, Figure 1 is a vertical longitudinal section through the complete apparatus. Fig. 2 is a detailed view showing a modified form of controlling means for the grain-admission valve.

Referring to the drawings by reference characters, A designates the outer casing of the steamer, which consists, preferably, of an upper cylindrical portion 1, which is connected at its lower end with an upwardly-tapering conical portion 2, which is in turn connected at its base with a downwardly-tapering conical portion 3 of somewhat greater length than the upper conical portion 2. The casing A is placed above a hopper B, from which the grain passes to any desired portion of the mill. In the cylindrical portion 1 of the casing is provided a downwardly-tapering conical guide 4, having a central opening which is normally closed by the cone-valve 5, which may be kept closed by means of a counterweight 6, attached to the end of a cord 7, which passes over a pulley or other suitable antifriction device on the cross-bar 8, or by means of a spring. When the counterweight is used, as shown in the drawings, it is desirable to provide on the cord 7 two stops 9 and 10, adapted to contact with the upper and lower surfaces, respectively, of a bar 11, which extends inward from the wall of the cylindrical portion 1 and through which the cord 7 passes. Below the guide 4, at the point of juncture of the cylindrical portion 1 with the conical portion 2 of the casing A, is provided a similar guide 12, which has a slightly smaller central opening, as shown, and which serves to bring together the wheat or other grain which is spread out by the cone-valve 5 as it enters the apparatus.

Within the conical portion 2 of the casing and supported in any suitable manner is a conical spreader 13, whose apex projects upward through the opening in the conical guide 12 and whose base lies in the plane of juncture of the sections 2 and 3 of the casing, the margin thereof being quite near the wall of the casing, as shown. Extending through the wall of the section 3 of the casing at a point slightly below the juncture of the sections 2 and 3 is a steam-pipe 14, leading from any suitable source of steam (not shown) and provided with a valve 15 to control the admission of steam. Above the pipe 14 is a ledge 13ª to deflect the grain inward to receive more effect from the steam. The end of pipe 14 is disposed at right angles to the main portion thereof and connects with an enlarged terminal pipe 14ª, which is provided at the lower end with a series of perforations, as shown, and an outwardly-disposed flange immediately above the perforations. The upper end of the terminal pipe 14ᵃ lies under the spreader 13 at a point midway between the plane of its base and its apex.

At the bottom of the apparatus is provided a cone-valve 16, similar to that at the top of the apparatus and normally kept closed by means of a spring 17 connecting the stem of the valve with a cross-bar 18 which is provided at a suitable height above the valve, though a counterweight and cord may be used, if preferred. In the walls of the conical section 2 of the casing are provided hand-holes, which are closed by pivoted doors 19 and which afford means whereby the hand can be introduced into the apparatus to clean the conical spreader 13 or to loosen the grain in case it becomes clogged in passing from the cylindrical section of the casing to the conical section.

Instead of the counterweight mechanism (shown in Fig. 1) for keeping valve 5 normally closed I may use the mechanism illustrated in Fig. 2. At the top of the valve 5, as shown in Fig. 2, is provided a stem 7ᵃ, which extends upward through a guide-opening in a transverse bar 11ᵃ. The upper end of the stem 7ᵃ is attached to a spiral spring 6ᵃ, the upper end of which connects with an eyebolt 9ᵃ, the threaded portion of which passes through an opening in cross-bar 8ᵃ and is adjustably secured in position by means of a nut 10ᵃ. It will be readily seen that the nut 10ᵃ affords means for adjusting the tension of the spring 6ᵃ to suit the pressure exerted on the valve 5 by grain passing downward through the cylindrical section 1 of the casing.

The operation of the apparatus is obvious. The valves 5 and 16 are normally kept closed by the springs or counterweights provided for that purpose; but when the weight of the wheat in the upper cylindrical portion of section 1 of the casing becomes sufficient to depress the valve 5 the grain will be allowed to enter upon conical section 2 of the casing and will pass downward over the spreader 13 into section 3 of the casing. When grain begins to enter the apparatus through the valve 5, steam should be admitted by opening the valve 15, and as the grain passes downward over the spreader 13 it is met at the lower margin thereof by the steam from the pipe 14ᵃ, which is brought into intimate contact with the grain, because it is spread out into a thin layer as it passes over the edge of the spreader, and the steam has to pass upward through the narrow passage between the edge of the spreader and the outer walls of the casing. The most effective action of the steam occurs at the margin of the spreader 13, as will be readily understood; but the action of the steam upon the grain is continued after the grain passes below the spreader 13. The conical guide 13ᵃ deflects the grain inward as it passes downward toward the bottom of the casing, and the steam, which escapes through the perforations in the lower portion of pipe 14ᵃ, continues to act upon the grain until it passes out of the casing through the valve at the bottom. The action of the steam upon the grain in the lower part of the casing is increased by increasing the tension of spring 17, which normally keeps the valve 16 closed, for by increasing the tension of spring 17 a larger quantity of grain is required to open valve 16, and hence there will always be an accumulation of grain at the bottom of the casing which will prevent the escape of steam when the valve 16 is open.

It is obvious that by suitably adjusting the tension of this spring-controlling valve 16 and varying the weight which normally closes valve 5 the quantity of grain which passes through the apparatus in a given time may be made large or small, as desired. In this way the apparatus may be made to steam the grain very thoroughly or only slightly, as may be desired. It is also obvious that connections may be provided, if desired, between the valve 5, which admits the grain to the apparatus, and the valve 15 in the steam-supply pipe, so that the admission of steam and grain to the apparatus may be made simultaneous and automatic.

As the form of steam-generator employed with the apparatus forms no part of the invention and any suitable type of generator may be employed with this apparatus, it has been regarded as unnecessary to show or describe any specific form of steam-generator for use therewith.

Having thus described my invention, what I claim as new, and desire to secure by Letters Patent, is—

1. The combination in apparatus for steaming grain of a casing having an automatic valve for admitting the grain in the upper portion thereof, a downwardly-tapering conical guide having a central opening disposed beneath said valve, an upwardly-tapering conical spreader having its apex near said opening, an annular ledge beneath said spreader and a steam-supply pipe having its outlet directed upward under the apex of said spreader and above the level of the base thereof and having a plurality of perforations below said ledge.

2. The combination in apparatus for steaming grain, of a casing having in the upper portion thereof an upwardly-tapering chamber, a central opening for the admittance of grain, a conical spreader disposed with its apex in said opening and having its margin in close proximity to the casing-wall, and a steam-supply pipe terminating beneath the apex of said spreader in an upwardly-disposed vertical section, with an open upper end above the level of the bottom of said spreader.

3. The combination in an apparatus for steaming grain of a casing having an upwardly-tapering upper chamber provided with a central inlet-opening, and a downwardly-tapering lower chamber with a central outlet-opening, a conical grain-spreader having its apex disposed in said inlet-opening and its base disposed substantially in the plane of juncture of said upper and lower chambers and having its margin in close proximity to the casing-wall, and a steam-supply pipe terminating in a vertical section having an open upper end under the apex of said spreader above the level of the base thereof and having a plurality of perforations below the level of the base of the spreader.

4. The combination in apparatus for steaming grain, of a casing having automatic inlet and outlet valves, a conical spreader having its apex disposed beneath said inlet-valve, an annular ledge inclined inwardly and downwardly disposed beneath said spreader, a steam-supply pipe terminating in an enlarged vertically-disposed section having the upper end thereof open and disposed immediately below and adjacent to the apex of said spreader and having a plurality of perforations below the level of said ledge, and a steam-deflector secured to said vertical pipe-section above said perforations.

In testimony that I claim the foregoing as my own I have hereto affixed my signature in the presence of two witnesses.

PETER PROVOST.

Witnesses:
L. D. EASTMAN,
J. CHAS. GUAY.